(12) United States Patent
Makowan et al.

(10) Patent No.: US 7,766,044 B2
(45) Date of Patent: Aug. 3, 2010

(54) TWO-WAY DAMPER

(75) Inventors: Ted J. Makowan, Schaumburg, IL (US); Timothy M. O'Shea, Chicago, IL (US)

(73) Assignee: Val-Matic Valve & Manufacturing Corp., Elmhurst, IL (US)

( * ) Notice: Subject to any disclaimer, the term of this patent is extended or adjusted under 35 U.S.C. 154(b) by 678 days.

(21) Appl. No.: 11/256,787

(22) Filed: Oct. 24, 2005

(65) Prior Publication Data

US 2007/0090320 A1    Apr. 26, 2007

(51) Int. Cl.
*F16K 15/14* (2006.01)
(52) U.S. Cl. .................. 137/849; 137/845; 137/859
(58) Field of Classification Search ............ 137/845, 137/859, 848, 849
See application file for complete search history.

(56) References Cited

U.S. PATENT DOCUMENTS 3,151,626 A * 10/1964 Everett .................. 137/493
3,401,867 A *  9/1968 Long et. al. ............... 55/361
3,610,279 A * 10/1971 McIntosh et al. ........... 137/576
4,244,379 A *  1/1981 Smith ...................... 600/579
5,041,095 A *  8/1991 Littrell .................. 604/167.04
5,743,884 A *  4/1998 Hasson et al. .......... 604/167.02
6,610,031 B1 * 8/2003 Chin ................... 604/167.04

* cited by examiner

*Primary Examiner*—John Rivell
*Assistant Examiner*—William McCalister
(74) *Attorney, Agent, or Firm*—Greer, Burns & Crain, Ltd.

(57) ABSTRACT

A two-way damper is provided including a retaining member and a baffle. The baffle comprises a flexible member with a first portion secured and held in a fixed position by the retaining member and a second portion normally oriented in a first position, but free to move relative to said first position. The baffle also comprises a third portion, arranged between the first and second portions, being flexible and resilient and allowing the second portion to move to a second position relative to the first position upon the application of a pressure differential across the baffle above a threshold pressure and causing the second portion to return to the first position upon the application of a pressure differential across the baffle below the threshold pressure.

18 Claims, 11 Drawing Sheets

TWO-WAY DAMPER

BACKGROUND OF THE INVENTION

The present invention generally relates to venting, exhaustion and/or admission of air in piping systems. More specifically, the present invention relates to a damper system and a method for controlling the entrance and exhaust of air into and from a venting system of a pipeline or reservoir.

Venting systems are used with pipelines to prevent vacuum conditions within a liquid pipeline, and to allow for exhaust or purging of gases from the liquid carried in the pipeline. In the case of an underground pipeline, such as used with potable water systems or waste or ground water systems, oftentimes the vent connections occur in underground vaults and reservoirs, which themselves need to be vented to the atmosphere. Although the pipes may be buried well below the frost line, if sub-freezing air flows into the vault due to the vault being vented, it is possible for the liquid in the pipeline to freeze, thereby damaging the pipeline. Also, various valves utilized in the vent system and located in the vault may be subject to damage or operational deficiencies if frost or ice builds up on the valve components.

Various types of dampers are known for use with vent pipes, including baffles that are moved by means of a motor, or baffles that are pivotally mounted and that move to a normally closed position by gravity due to a weighted baffle. The motorized baffles require electricity to operate and may not have an open fail safe condition in the event of a power loss. The motorized baffles also typically are pivotally mounted and if a build up of frost or ice occurs on the baffle, they may be prevented from pivoting into an open position, even under the power of the motor. The weighted baffles must be mounted in a horizontal pipe run in order for the baffle to be oriented correctly in the vent pipe to close the pipe when no gas is flowing through the vent pipe. These weighted baffles also are typically pivotally mounted and thus suffer the same problems described above due to ice and frost build up.

A need exists for an improved damper for a vent pipe that will allow for gas flow in either direction upon a certain threshold pressure differential across the baffle, yet will normally prevent the flow of gas below the determined threshold pressure differential, which will address the problems previously described.

SUMMARY OF THE INVENTION

The present invention provides a two-way baffle for a vent pipe that will allow for gas flow in either direction when a pressure differential across the baffle is above a threshold pressure. The baffle will prevent the flow of gas when less than the threshold pressure differential exists across the baffle. The baffle also does not contain any rotating or pivoting parts, and so is not subject to having immobile parts in sub-freezing temperatures that would prevent operation of the baffle. The baffle may be oriented in a horizontal pipe, a vertical pipe, or in a pipe arranged at any other angle.

In an embodiment, a two-way damper comprising a retaining member and a baffle is provided comprising a flexible member with a first portion secured and held in a fixed position by the retaining member, a second portion normally oriented in a first position, but free to move relative to the first position, and a third portion, arranged between the first and second portions being flexible and resilient. The third portion will allow the second portion to move to a second position relative to the first position upon the application of a pressure differential across the baffle above a threshold pressure and causing the second portion to return to the first position upon the application of a pressure differential across the baffle below the threshold pressure.

In an embodiment, the flexible member is secured and held stationary at an outer periphery thereof.

In an embodiment, the flexible member is secured and held stationary along the entire outer periphery thereof.

In an embodiment, the flexible member is in the form of a generally circular disk and is secured and held stationary at two end points of a chord of the disk. In an embodiment, the cord comprises a diameter of the disk.

In an embodiment, a two-way damper comprising a combination of a baffle and a retaining member is provided, the baffle comprising a generally circular flexible member with a first portion, at a portion of a periphery of the member, secured and held in a fixed position by the retaining member, a second portion spaced from the retaining member normally oriented in a first position, but free to move relative to the first position, and a third portion, arranged between the first and second portions, being flexible and resilient. The third portion allows the second portion to move to a second position relative to the first position upon the application of a pressure differential across the baffle above a threshold pressure and causes the second portion to return to the first position upon the application of a pressure differential across the baffle below the threshold pressure.

In an embodiment, the retaining member comprises a ring and the baffle is secured at its entire periphery to the ring.

In an embodiment, the retaining member comprises a ring of rigid material and a mechanical fastening element extending between the ring and the baffle at two or more points around the periphery of the baffle.

In an embodiment, the ring of rigid material comprises a conduit and the mechanical fastening element comprises a threaded fastener extending through the conduit and into the baffle.

In an embodiment, a two-way damper is provided comprising a retaining ring having an open center with a centerpoint and a valve member comprising a plurality of flexible and resilient leaves arranged around the ring and each having a fixed proximal end secured to the retaining ring and a free distal end located substantially at the centerpoint of the ring. The leaves are movable relative to each other and arranged such that substantially the entire open center of the ring is occupied by the leaves.

In an embodiment, the leaves are arranged in overlapping relationship to adjacent leaves.

In an embodiment, the plurality of leaves are formed in a single disk of material.

In an embodiment, the leaves are formed by radial slits in the disk, leading from a centerpoint of the disk and extending towards the ring.

In an embodiment, the plurality of leaves are formed in two overlying disks.

In an embodiment, the leaves are formed by radial slits in the disks, leading from a centerpoint of the disks and extending towards the ring.

In an embodiment, the leaves have an angular slit which extends from the radial slit at an end adjacent to the ring.

In an embodiment, the disks are sandwiched between two retaining rings.

In an embodiment, the ring includes a radiused edge at said open center.

In an embodiment, the plurality of leaves are formed in two overlying disks which are identical to each other, formed with radial slits leading from a centerpoint of the disks and extending towards the ring. Each radial slit terminates at an angular slit extending a quarter of the way towards an adjacent radial slit. Each disk has a top face and a bottom face, the top faces being arranged to face each other and the disks being rotated relative to one another to interleave and overlap the leaves relative to one another.

Other details of embodiments of the present invention are illustrated in the drawings and described below.

DETAILED DESCRIPTION OF THE PREFERRED EMBODIMENTS

The present invention generally relates to a damper system which may be used in connection with exhausting and emitting air when installed in vent pipes of water and waste handling pipelines and/or piping systems. A primary function of such vent pipes is to prevent air and/or vacuum related problems within a liquid pipeline. The damper system includes a baffle to control or prevent the flow of gas through the vent pipe when a pressure differential across the baffle is below some predetermined threshold pressure, but to allow passage of gas, in either direction through the vent pipe when the pressure differential across the baffle is above the threshold pressure.

Figure 1:
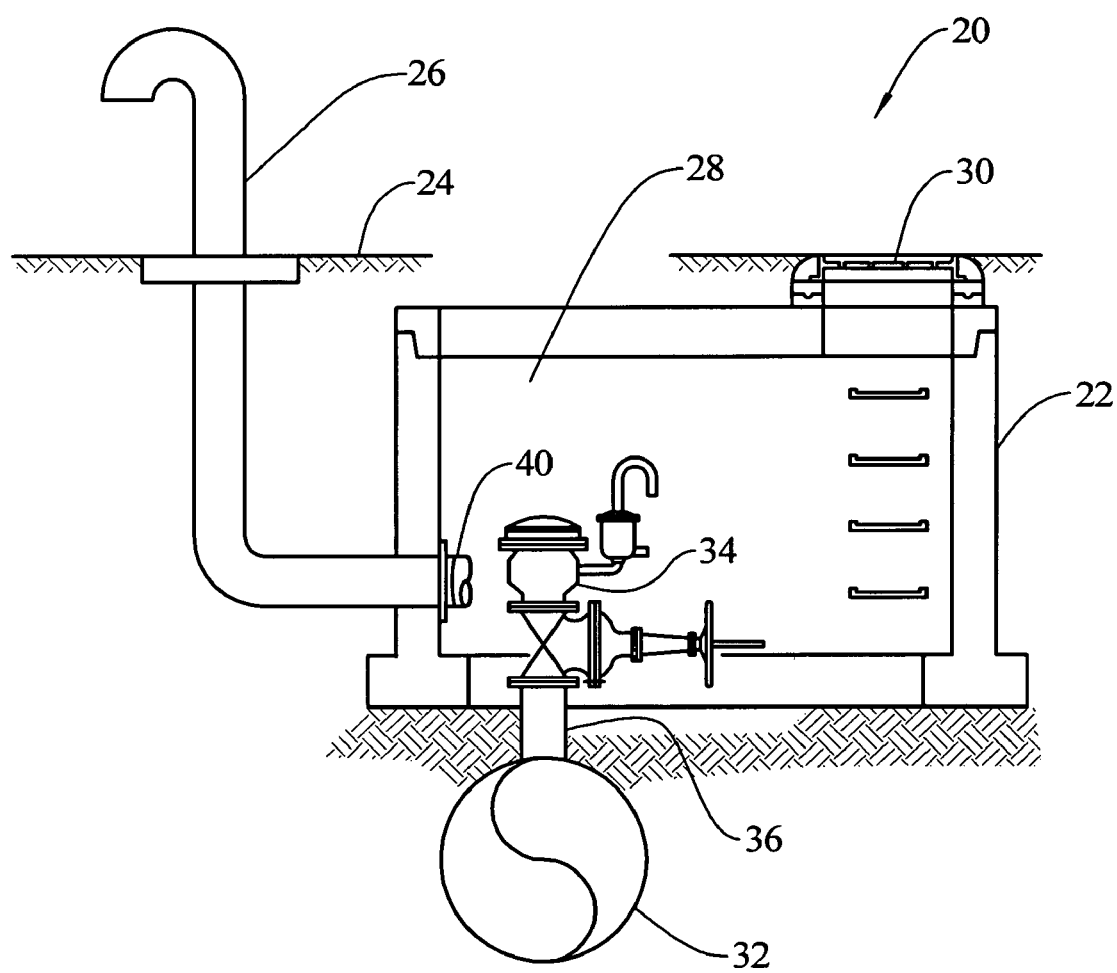
FIG. 1 illustrates a cross-sectional view of a liquid pipeline system including a vent and damper system embodying the principles of the present invention.

Referring now to FIG. 1, a general arrangement of a liquid transport system 20 utilizing the present invention is illustrated. The system 20 includes a portion that is positioned within a vault 22 that is buried below a surface grade 24. The vault 22 includes a vent pipe 26 to allow an inflow and outflow of air relative to an interior 28 of the vault. Typically the interior 28 of the vault 22 is accessible through a removable manhole cover 30 or the like. A pipeline 32 extends through or below the vault 22 which may be used to transport potable water, wastewater, and other liquids. In order to prevent damage to the pipeline 32, it is customary to provide an air valve 34 in a vent line 36, as discussed in U.S. Pat. No. 5,613,513, which is incorporated herein by reference. Generally, the air valve 34 allows for a flow of air into and out of the pipeline 32 as required by the pressures in the pipeline, but prevents a flow of liquid from leaving the pipeline. When the pressure in the pipeline 32 is low, that is, below atmospheric pressure, air from the interior 28 of the vault 22 is allowed to be drawn into the pipeline 32 through the air valve 34 and vent line 36.

Although the vault 22 is positioned below ground level 24, since the vent pipe 26 allows outside air into the interior 28 of the vault, the interior of the vault would be subject to below freezing temperatures if there were a free flow of air into the interior of the vault through the vent pipe. In order to prevent such free flow of air, yet allow for venting of the pipeline 32 and to avoid vacuum formation in the pipeline, a two-way damper 40 is provided in the vent pipe 26. This two-way damper 40 may be positioned in a horizontal portion of the vent pipe 26 as shown, or may be positioned in a vertical portion of the vent pipe, or arranged at any angle, without detracting from the operation of the damper, as explained below. This two-way damper will prevent a free flow of air into or out of the interior 28 of the vault 22, unless a certain threshold pressure differential exists between the interior of the vault and normal atmospheric pressure. When such a threshold pressure does exist, such as when the air valve 34 is actually admitting air into the pipeline 32 or allowing air to exhaust from the pipeline, then the damper 40 will allow for air to freely flow through the damper, as needed. The two-way damper may be constructed in various different embodiments, two of which are described in detail below.

Figure 2:
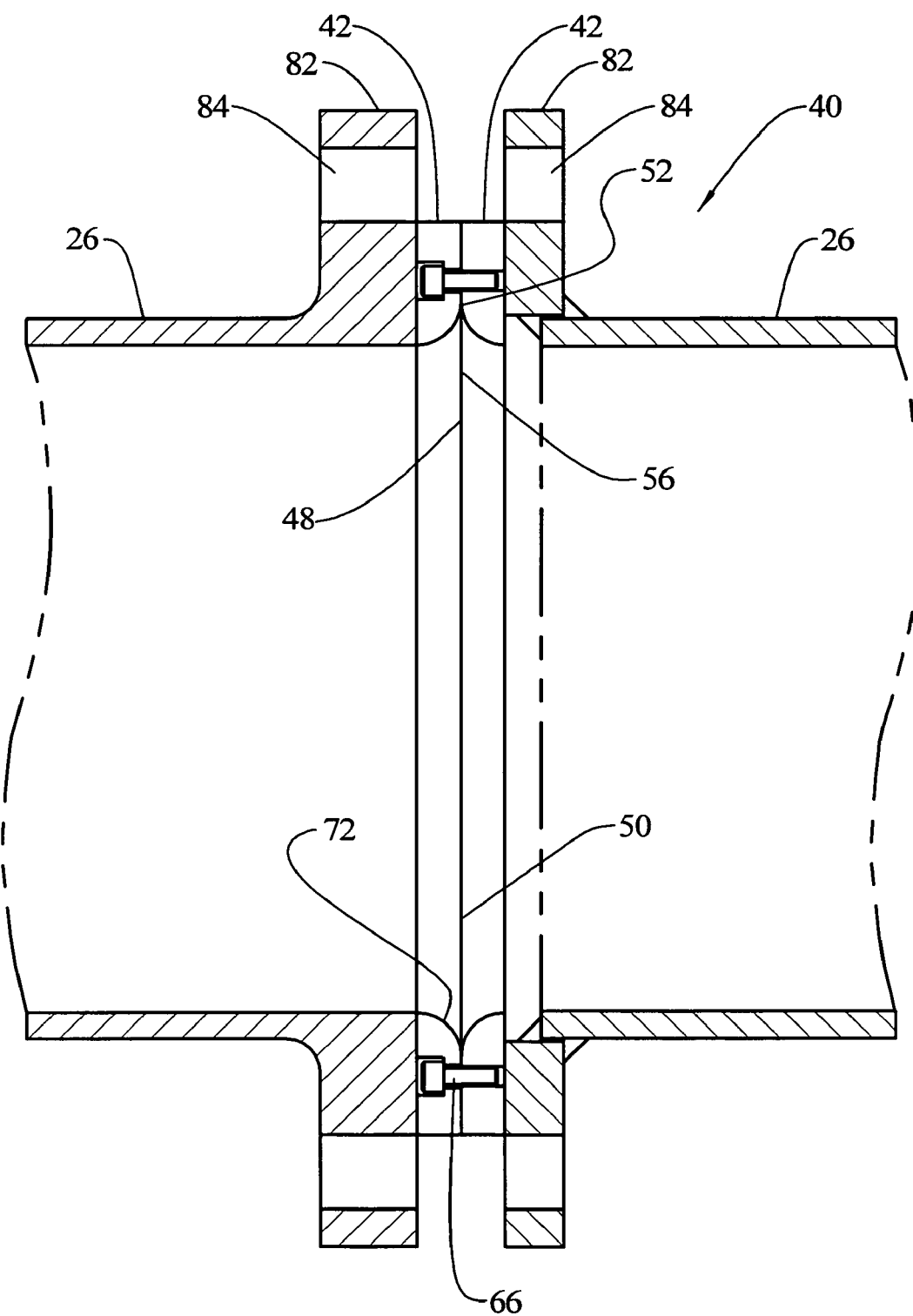
FIG. 2 illustrates a cross-sectional view of an embodiment of the damper system of the present invention in a closed position.
Figure 3:
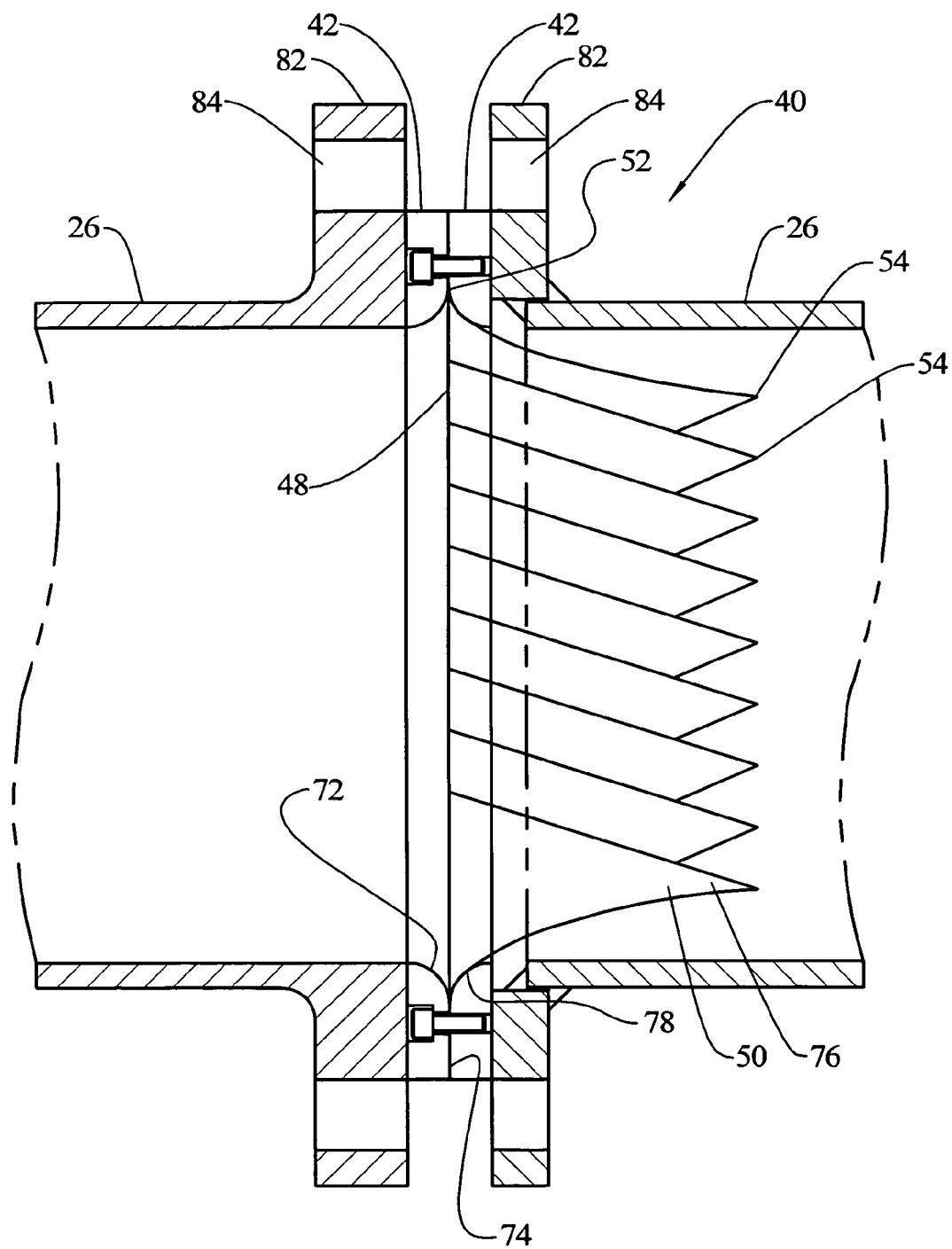
FIG. 3 illustrates a cross-sectional view of the embodiment of FIG. 2 in an open position.

In FIGS. 2-6 a first embodiment of the two-way damper 40 is illustrated as being positioned in the vent pipe 26. In this embodiment, the two-way damper 40 includes a retaining ring 42 having an open center 44 with a centerpoint 46. The two-way damper 40 also includes a valve member 48 having a plurality of flexible and resilient leaves 50 arranged around the ring 42 and each having a fixed proximal end 52 secured to the retaining ring and a free distal end 54 located substantially at the 46 centerpoint of the ring. The leaves 50 are movable relative to each other and are arranged such that substantially the entire open center 44 of the ring 42 is occupied by the leaves. FIG. 2 shows the leaves 50 in a normally closed position when the pressure differential across the valve member 48 is below a threshold pressure level, and FIG. 3 shows the leaves in an open position when the pressure on the left side of the valve member 48 is greater than the pressure on the right side of the valve member, by an amount greater than the threshold pressure level. In such a situation, the leaves 50 flex into the open position and allow the passage of air from left to right in a virtually unhindered manner. The damper 40 works exactly the same in the opposite direction when the pressure is exerted from the opposite side.

Figure 6:
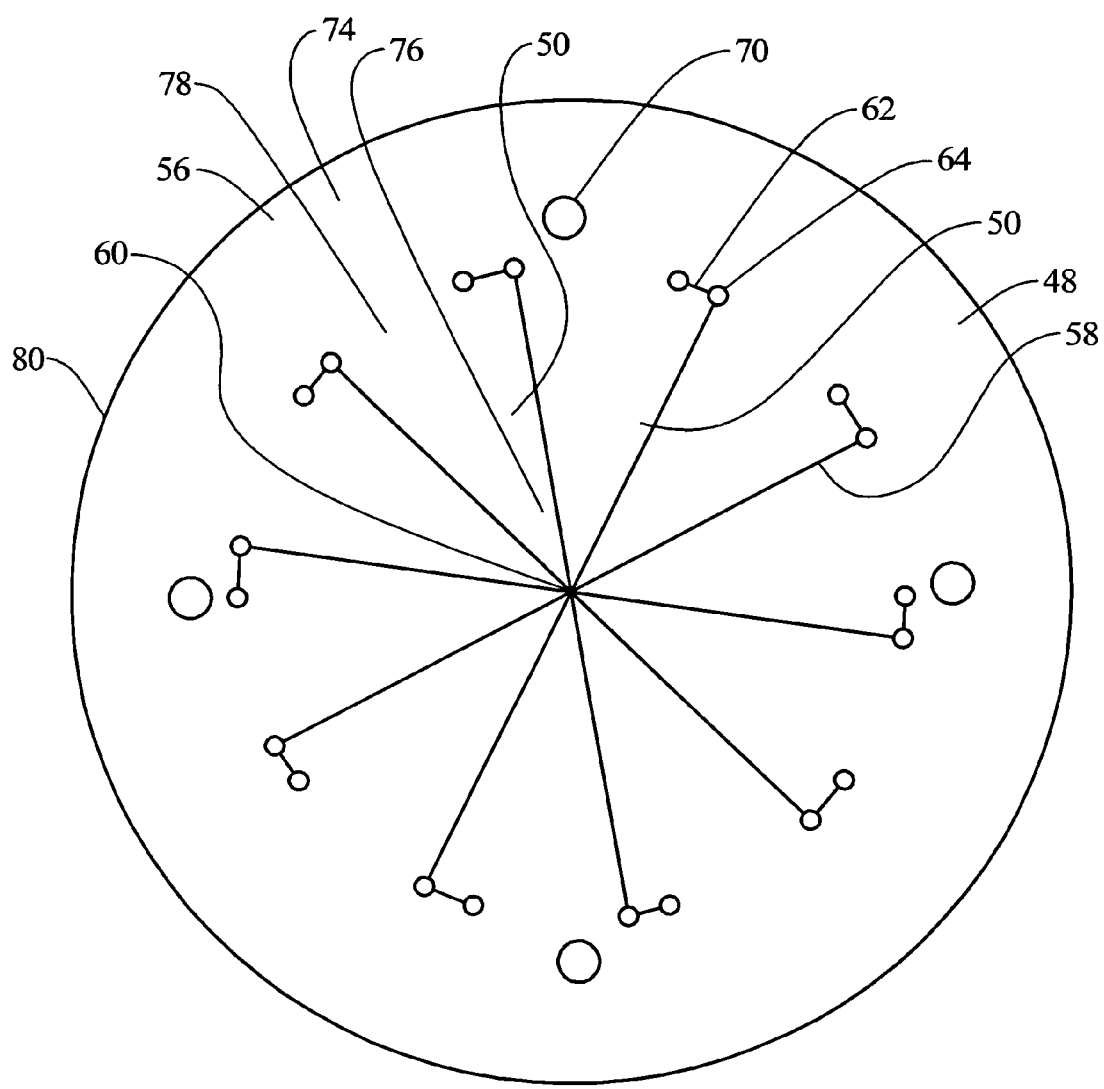
FIG. 6 illustrates an end elevational view of a baffle used in the embodiment of FIG. 2.

The plurality of leaves 50 may be formed in a single disk of material 56, such as a thin flexible plastic material, as shown in isolation in FIG. 6, or two or more disks may be stacked on one another in a face to face arrangement. In a particular embodiment, the plurality of leaves 50 are formed in two overlying disks 56. The leaves 50 are formed by radial slits 58 in the disk 56, leading from a centerpoint 60 of the disk and extending radially outward towards the ring 42. The leaves 50 have an angular slit 62 which extends from each radial slit 58, in one angular direction, substantially perpendicular to the radial slit, at an end 64 of the radial slit adjacent to the ring 42. A junction point between the angular slit 62 and the radial slit 58 may include a relief cut out, in the form of a circle to prevent tearing of the material adjacent to the slits. An end of the angular slit 62 may also be provided with such a relief cut out.

Figure 4:
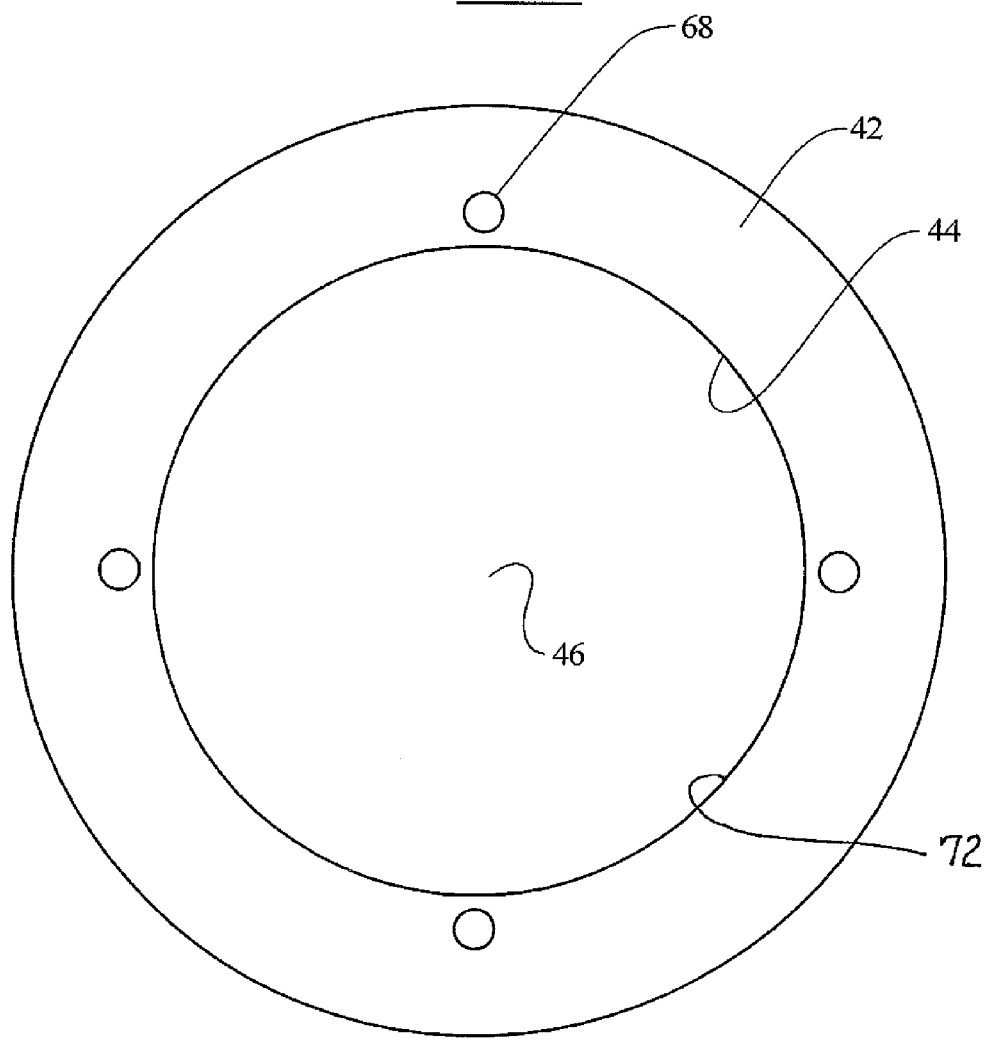
FIG. 4 illustrates an end elevational view of a retaining ring used in the embodiment of FIG. 2.
Figure 5:
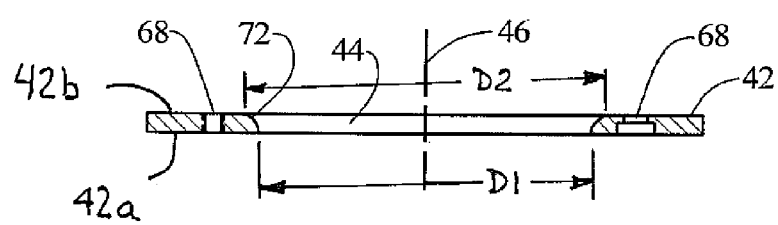
FIG. 5 illustrates a side sectional view of the retaining ring of FIG. 4.

As illustrated in FIG. 2, the disk 56 or disks may be sandwiched between two retaining rings 42 and held in place with threaded fasteners 66 which extend through openings 68 in the rings and openings 70 in the disks. Half of the openings 68 in the rings 42 may be internally threaded so that separate retaining fasteners, such as nuts, will not be required. The open center 44 of the ring 42 may be defined by a radiused edge 72 to allow the leaves 50 to bend over the edge as shown in FIG. 3, without a sharp edge which might concentrate bending stress that could damage the disks 56 or the leaves. The edge 72 is curved in a circumferential direction, as best seen in FIG. 4, such that the edge is generally circular in shape in a circumferential direction. As best seen in FIG. 5, the edge 72 is also curved in an axial to radial direction from a first face 42a of the ring 42 to a second face 42b of the ring. That is, the edge 72 at the first face 42a is generally aligned in an axial direction (perpendicular to the first face) and then the edge changes orientation as it approaches the second face 42b towards a radial direction (parallel to the second face). With such a construction, a diameter D1 of the open center 44 is smaller at the first face 42a than a diameter D2 of the open center at the second face 42b. When the disk 56 or disks are sandwiched between two retaining rings 42, as shown in FIG. 2, the first faces 42a of the rings are arranged to face each other. The radiused edge 72 also is sized to allow an entire cord of the base of a triangle of the leaves 50 to remain on the radius, which provides greater air flow through the damper 40 when the leaves are in the open position as shown in FIG. 3.

In a particular embodiment, the plurality of leaves 50 may be formed in two overlying disks 56 which are identical to each other, as shown in FIG. 6, formed with the radial slits 58 leading from the centerpoint 60 of the disks and extending towards the ring, each radial slit terminating at the angular slit 62 which extends a quarter of the way towards an adjacent radial slit. Each disk 56 has a top face and a bottom face, and the top faces are arranged to face each other by flipping one disk over relative to the other disk. The disks 56 are then rotated relative to one another around the centerpoint 60 to overlap adjacent leaves 50 relative to one another. An edge of each leaf 50 is inserted into a radial slit 58 in the other disk to overlap and interleave the two disks, and the radial slits 62, each extending a quarter of the way towards the next adjacent radial slit, will allow the leaves to overlap half way with each other. In this manner, each adjacent leaf 50 in the assembled two disks 56 will be from alternating disks. This type of construction has been demonstrated to provide resiliency to the flexible leaves 50, so that when the pressure differential across the disks 56 drops below the threshold pressure, the leaves will return to their normal position, blocking the vent pipe 26, and preventing any ambient flow of air through the vent pipe from natural convection.

The disks 56 may be made of a thin flexible material that has some resiliency, such as a plastic material like mylar, a high durometer rubber, or spring steel. When the leaves 50 are moved to their open position as shown in FIG. 3, the opening has the shape of a flow nozzle which provides a low head loss across the damper system 40. The open center 44 should have generally the same diameter as the internal diameter of the vent pipe 26.

Thus, this first embodiment provides a two-way damper 40 comprising a retaining member in the form of the ring 42 and a baffle in the form of the valve member 48, the baffle comprising a flexible member in the form of the disk 56 with a first portion 74 of the baffle secured and held in a fixed position by the retaining member and a second portion 76 normally oriented in a first position, but free to move relative to the first position, a third portion 78, arranged between the first and second portions being flexible and resilient and allowing the second portion to move to a second position relative to the first position upon the application of a pressure differential across the baffle above a threshold pressure and causing the second portion to return to the first position upon the application of a pressure differential across the baffle below the threshold pressure. The flexible member 56 is secured and held stationary at an outer periphery 80 thereof, and along the entire outer periphery thereof.

Further, this first embodiment provides a two-way damper 40 comprising a combination of the baffle 48 and the retaining member 42, the baffle comprising the generally circular flexible member 56 with the first portion 74, at a portion of the periphery 80 of the member, secured and held in a fixed position by the retaining member, the second portion 76 spaced from the retaining member normally oriented in the first position, but free to move relative to the first position, and the third portion 78, arranged between the first and second portions, being flexible and resilient and allowing the second portion to move to the second position relative to the first position upon the application of a pressure differential across the baffle above the threshold pressure and causing the second portion to return to the first position upon the application of a pressure differential across the baffle below the threshold pressure. The retaining member 42 comprises the ring and the baffle is secured at its entire periphery to the ring.

The two-way damper 40 may be secured in the vent pipe 26, such as by flanges 82 formed on or welded to the ends of the vent pipe, with threaded fasteners, such as bolts (not shown) extending through openings 84 in the flanges serving to clamp the damper in the vent pipe. The rings 42 may be made of a plastic material or a light weight metal in that there is no need for strength or heavy duty structure for the rings since they remain stationary and may be sandwiched between the flanges in the vent pipe 26.

A modification of the first embodiment of the two-way damper is essentially the same as the first embodiment except that a ring-shaped gasket with an outside diameter of the same size as the periphery 80 and an inside diameter falling just outside of the ends of the slits 62 is inserted between two disks 56 to give a curvature to the leaves 50 giving them additional stiffness. This has been found to extend the life of the disks 56 and leaves 50 when they are constructed of a plastic material and to reduce any noise causes by resonances of the leaves with the air flowing over them when the damper is in the open position.

Figure 7:
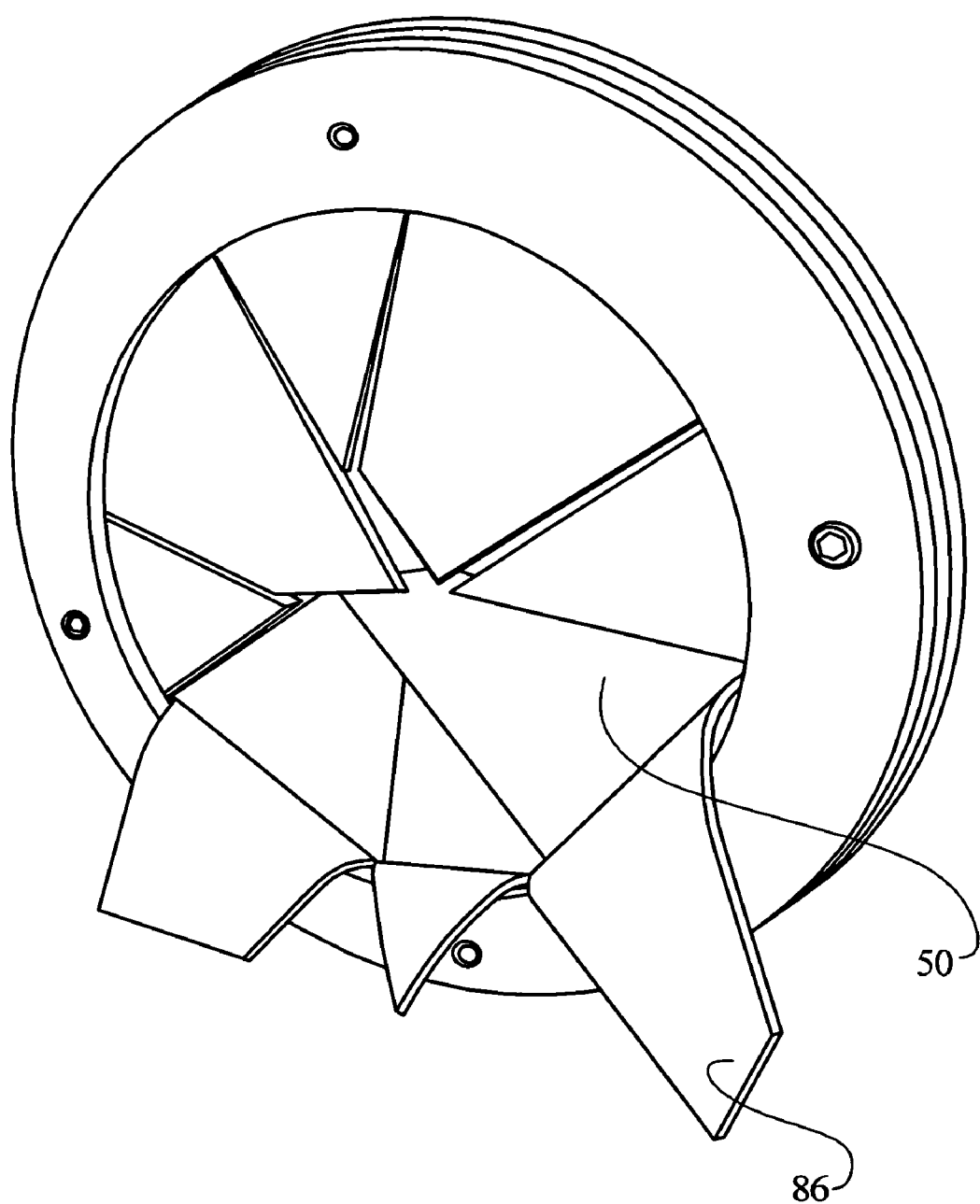
FIG. 7 illustrates an end elevational view of an assembled damper system with a modification of the embodiment of FIG. 2.

Another modification of the first embodiment, as illustrated in FIG. 7, is to sandwich single or multiple disk(s) 56 between two sheets of thin resilient material 86, such as a reinforced rubber material, which are slit in the same manner and along the same lines as the closing disk 56. Portions of the resilient material 86 are shown pulled back in FIG. 7 to permit viewing of the disk 56. The resilient material 86 provides the function of 1) thermal insulation and 2) protection of the mylar disk 56 from abrasion when the disk strikes the walls of rough vent pipes.

Figure 8:
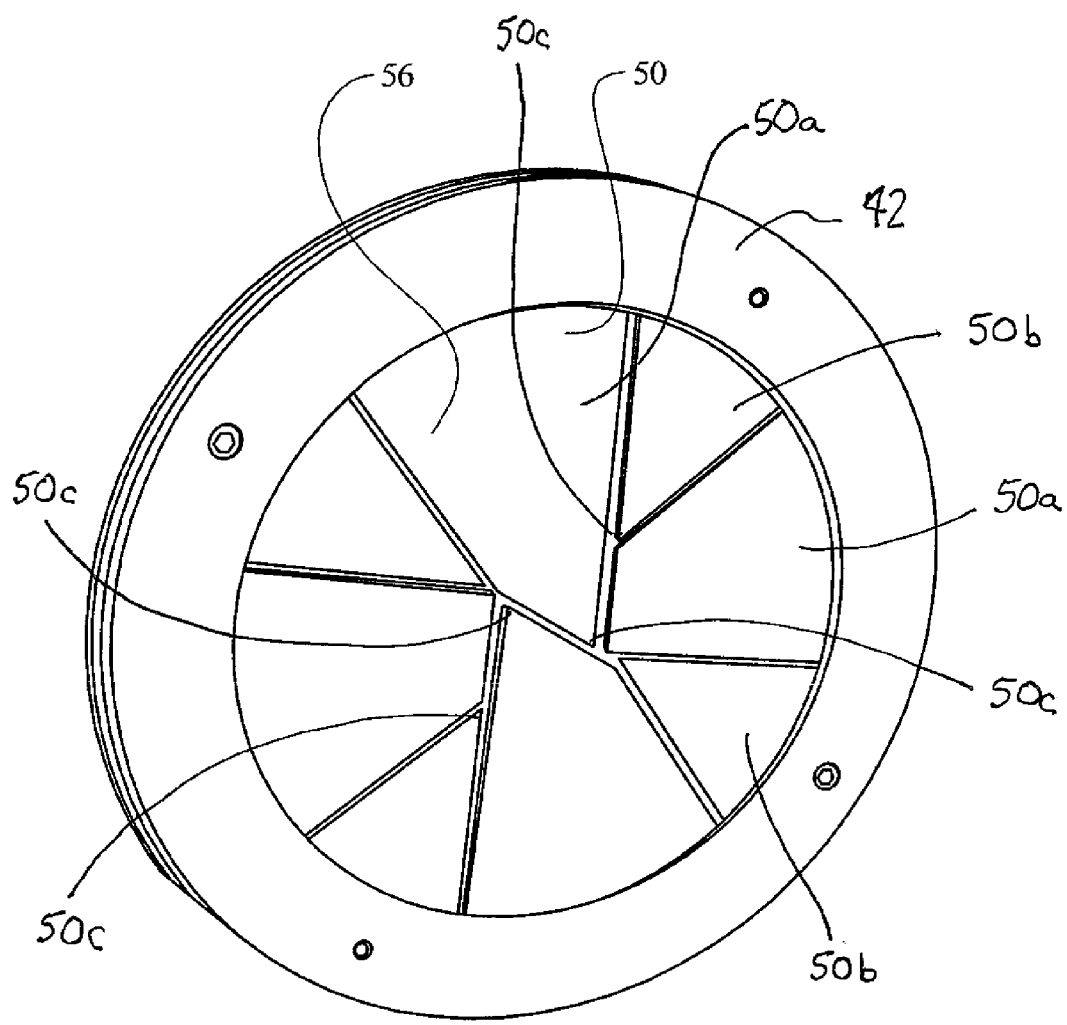
FIG. 8 illustrates an end elevational view of an assembled damper system with another modification of the embodiment of FIG. 2.
Figure 9:
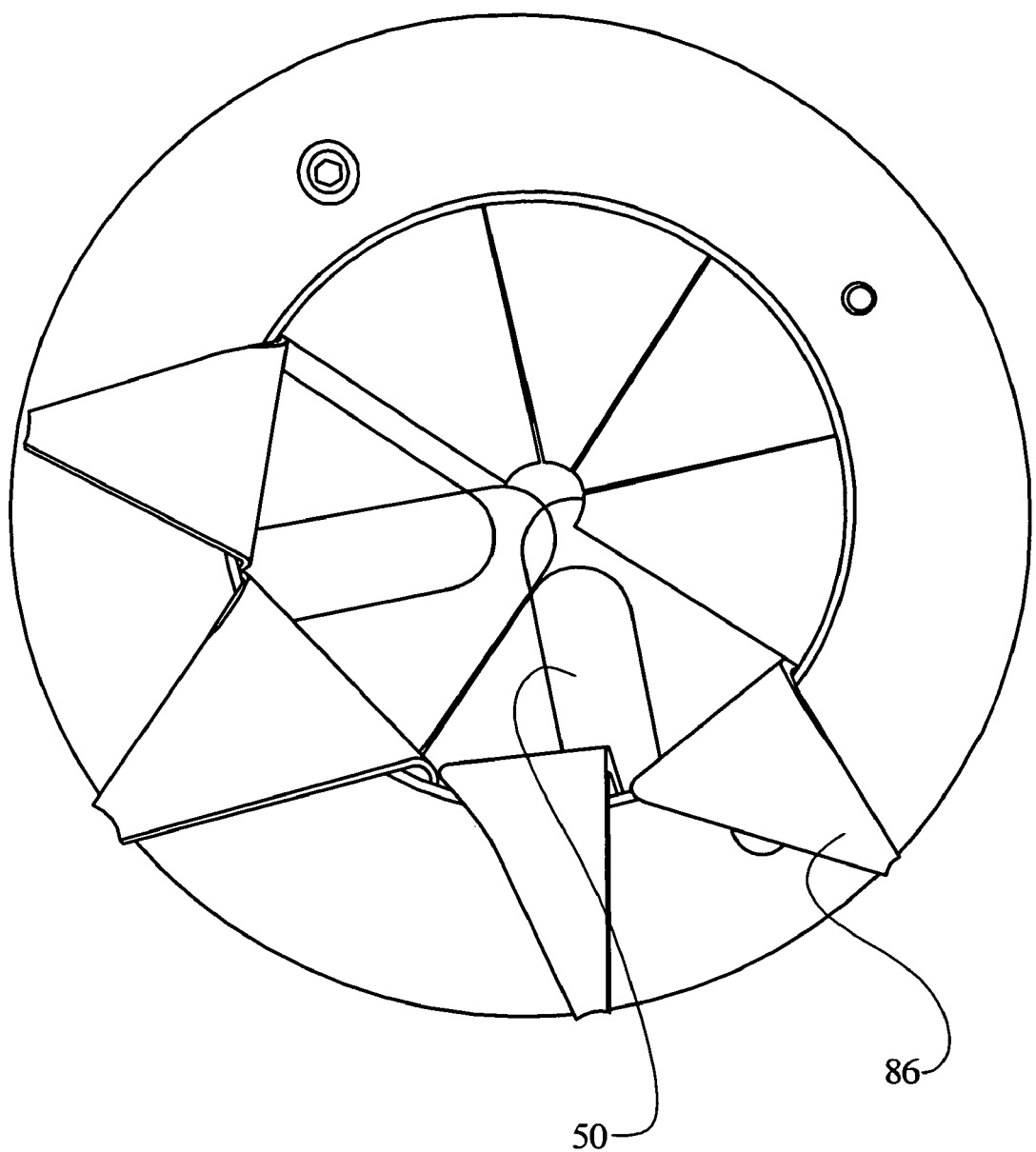
FIG. 9 illustrates an end elevational view of an assembled damper system with a further modification of the embodiment of FIG. 2.
Figure 10:
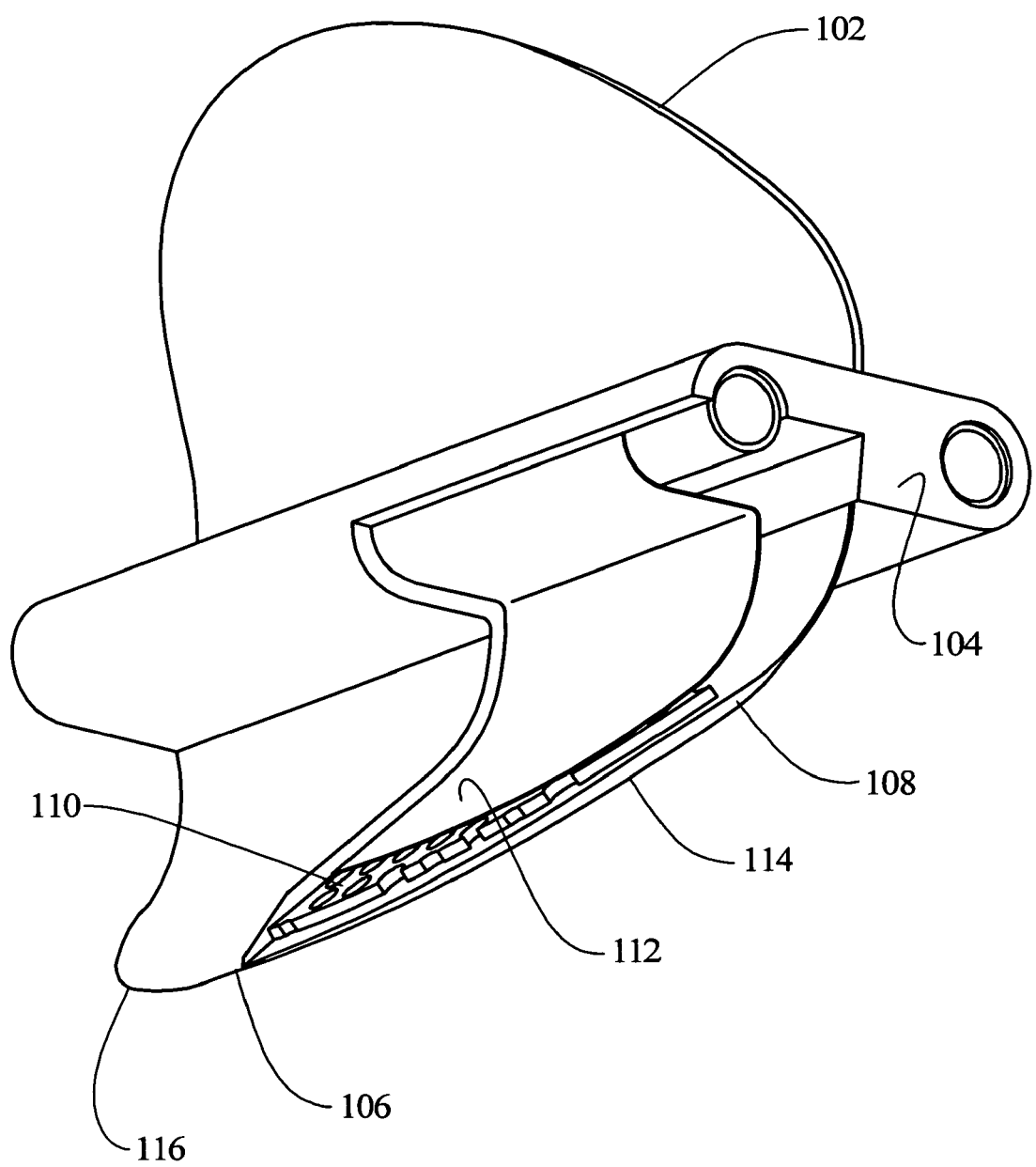
FIG. 10 illustrates a perspective view of another embodiment of a baffle used with the damper system of the present invention.
Figure 11:
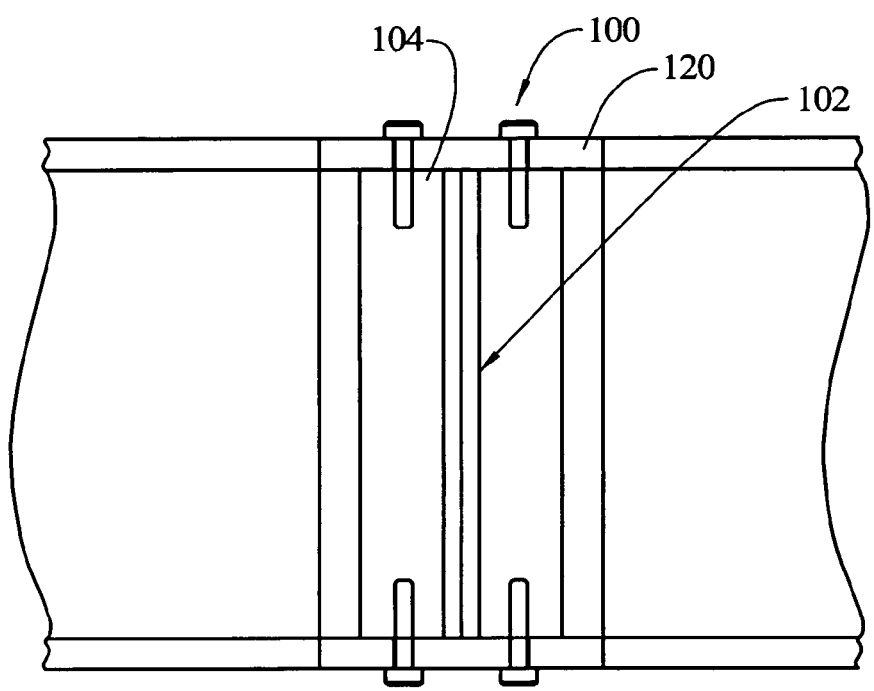
FIG. 11 illustrates a side sectional view of the embodiment of the damper system using the baffle of FIG. 10.
Figure 12:
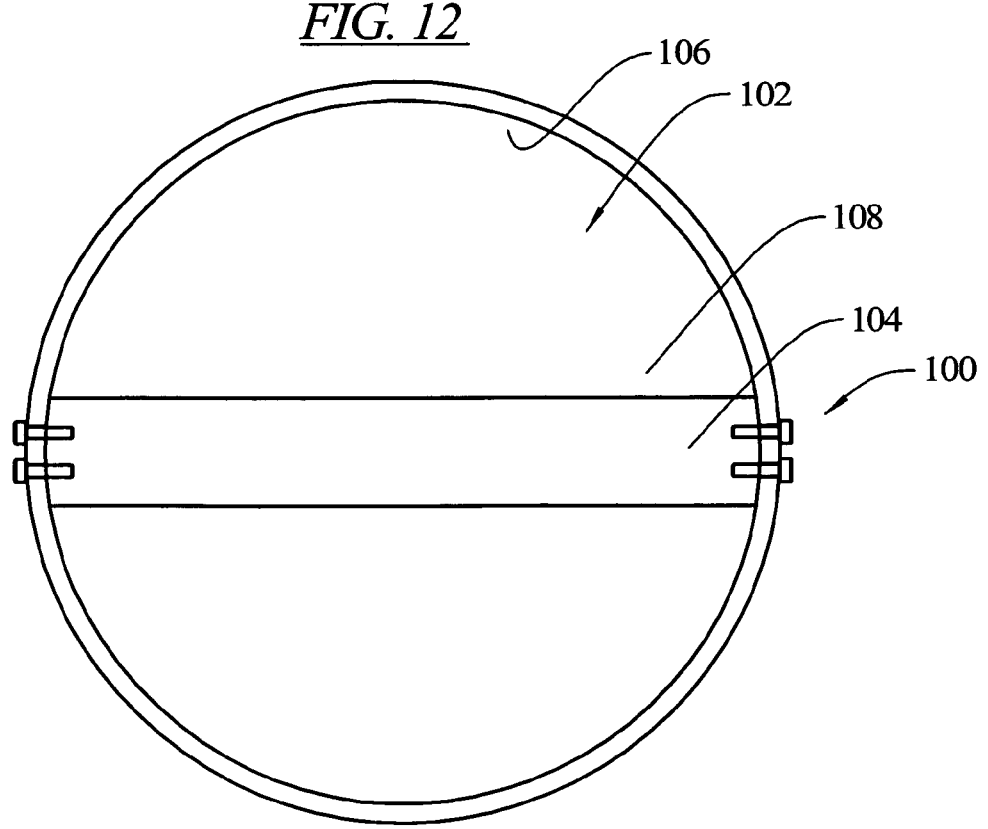
FIG. 12 illustrates an end sectional view of the damper system of FIG. 11.
Figure 13:
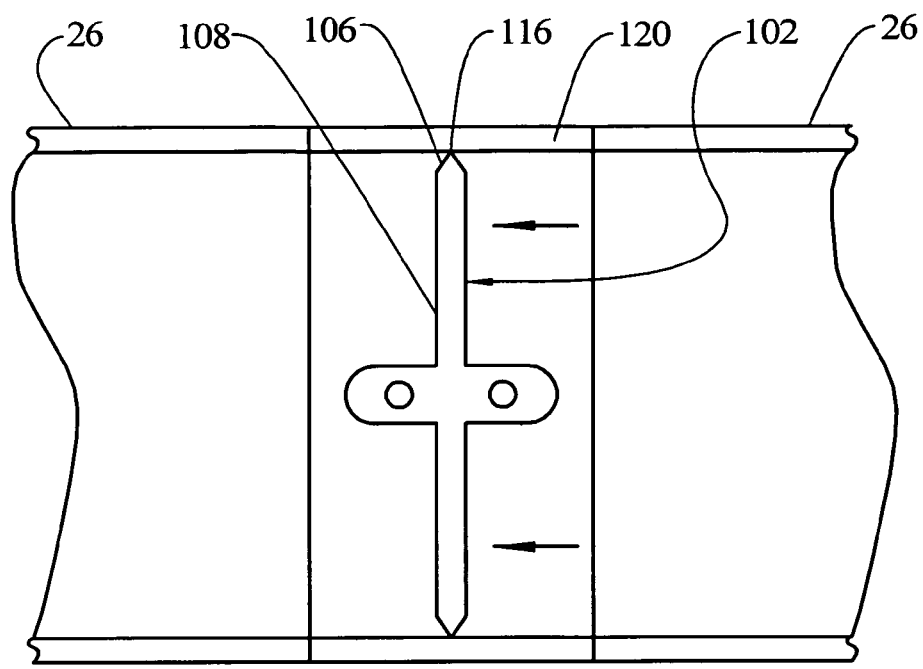
FIG. 13 illustrates a side sectional view of the damper system of FIG. 11 taken at 90 degrees from the view of FIG. 11, and in the closed position.

Further modifications of the first embodiment, as illustrated in FIGS. 8 and 9, are to cut the disks 56 so that the leaves 50 are of different lengths (FIG. 8) and/or have rounded ends (FIG. 9) to lower resonance and reduce damage to the leaves, particularly when they are made of a plastic material such as mylar. As shown in FIG. 8, the leaves 50 alternate around the circumference of the ring 42 between relatively long leaves 50a and relatively short leaves 50b, whereby each relatively long leaf 50a has two adjacent neighbors at the proximal ends 52 that are relatively short, and each relatively short leaf 50b has two adjacent neighbors at the proximal ends 52 which are relatively long. When the leaves 50 have different lengths, there may not be a common meeting point for all of the leaves in that some leaves extend to or beyond the centerpoint 46 of the ring 42, while other leaves stop short of the centerpoint. As shown in FIG. 8, the distal ends 54 of the several of the leaves 50 terminate radially inwardly at points 50c that are separated from one another, rather than at a common point as is the case of the leaves shown in the embodiment of FIG. 6. In the case where the leaves 50 have rounded ends, as shown in the embodiment of FIG. 9, all of the leaves may stop short of the centerpoint, or some of the leaves may extend to the centerpoint or beyond. If all of the leaves 50 stop short of the centerpoint, and if resilient material 86 is used, the resilient material may be cut so that its leaves all reach the centerpoint, or nearly so, such that substantially all of the opening interior of the disk is closed off by the disk 56 or the resilient material.

Another embodiment of the two-way damper 40 is illustrated in FIGS. 10-14. In this embodiment, the two-way damper 40 comprises a retaining member 100 which may include one or more threaded fasteners, and a baffle 102. The baffle 102 comprises a flexible member with a first portion 104 secured and held in a fixed position by the retaining member 100 and a second portion 106 normally oriented in a first position (FIG. 13), but free to move relative to the first position. The baffle 102 also comprises a third portion 108, arranged between the first 104 and second 108 portions being flexible and resilient and allowing the second portion to move to a second position (FIG. 14) relative to the first position upon the application of a pressure differential across the baffle above a threshold pressure and causing the second portion to return to the first position upon the application of a pressure differential across the baffle below the threshold pressure.

Figure 14:
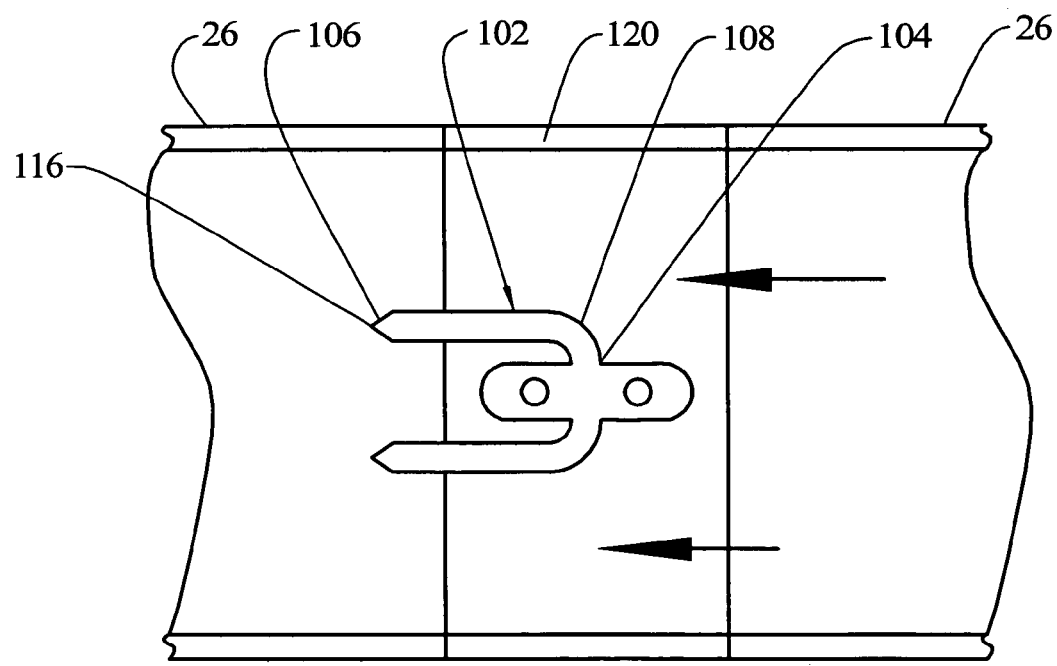
FIG. 14 illustrates a side sectional view of the damper system of FIG. 11 taken at 90 degrees from the view of FIG. 11, and in the open position.

In this embodiment, the baffle 102 is a circular disk of flexible, yet resilient material, and may comprise a composite or lamination of different materials. For example, the baffle 102 may have an inner core 110 of a relatively rigid metal plate, such as a perforated aluminum plate layer to provide stiffness. This core 110 may be covered by another layer 112, such as a nylon fabric layer as a reinforcement for the baffle 102. Finally, the outer surface 114 may be made of a rubber material that is flexible. The entire combination or composite will be both flexible and resilient, allowing the baffle 102 to deflect as shown in FIG. 14 to permit the passage of air in pressure differentials above the threshold pressure level and to return to a normal configuration (FIG. 13) to block any flow of ambient air when the pressure differential is below the threshold pressure level. An edge 116 of the baffle that engages or abuts the surrounding pipe 26 may be tapered to have a very thin thickness, such as a knife edge, in order to reduce the amount of surface area contact between the baffle and the surrounding pipe, in order to reduce friction and to reduce the possibility of frost or ice buildup along the edge which might prevent or hamper operation of the damper in cold conditions.

A central hub portion 118 may be provided for receiving the retaining member 100 which secures and holds the baffle 102 stationary at an outer periphery of the baffle. As illustrated, this embodiment may have the baffle 102 in the form of a generally circular disk and which is secured and held stationary at two end points of a chord of the disk. If the hub 118 is positioned symmetrically on the baffle 102, as shown, the chord comprises a diameter of the disk. When the retaining member 100 is in the form of a threaded fastener, or similar fastener, two such fasteners may be provided at each end of the chord where the baffle is secured in order to prevent the baffle from rotating in the pipe. The retaining member 100 may also include a ring of rigid material 120, such as a length of conduit, which may be secured within the vent pipe 26 by any number of known attachment methods.

Thus, this embodiment provides a two-way damper comprising a combination of the baffle 102 and the retaining member 100. The baffle 102 comprises a generally circular flexible member with a first portion 104, at a portion of a periphery of the member, secured and held in a fixed position by the retaining member 100, the second portion 106 spaced from the retaining member normally oriented in a first position (FIG. 10), but free to move relative to the first position, and the third portion 108, arranged between the first and second portions, being flexible and resilient and allowing the second portion to move to a second position relative to said first position (FIG. 11) upon the application of a pressure differential across the baffle above a threshold pressure and causing the second portion to return to the first position upon the application of a pressure differential across the baffle below the threshold pressure. The retaining member 100 may comprise the ring of rigid material 120 and a mechanical fastening element extending between the ring and the baffle at two or more points around the periphery of the baffle. The ring of rigid material 120 may comprise a conduit and the mechanical fastening element may comprise a threaded fastener extending through the conduit and into the baffle.

Although the primary use of the present invention is within water and waste water piping/pipeline systems, typically having round pipes, the present invention may be implemented within a variety of applications in which gas flow control may be required, and the shape of the baffle or flexible member may be modified to accommodate the cross sectional shape of the air passage in which it is situated.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A two-way damper comprising:
    two retaining rings, each having a first face, a second face and an open center with a centerpoint;
    the open center of each ring being defined by an edge, each edge being curved in a circumferential direction such that each edge is generally circular in shape in a circumferential direction, and each edge being curved in an axial to radial direction from the first face to the second face such that a diameter of the open center is smaller at the first face than a diameter of the open center at the second face;
    the two rings being arranged with their second faces facing each other;
    a valve member comprising a plurality of flexible and resilient leaves formed in at least one disk of material arranged angularly around the inside of said rings and between said rings, said disk of material having a normal flat state, for each disk of material each leaf having a fixed proximal end secured by being sandwiched between said retaining rings at the second faces and a free distal end located toward said centerpoint of said rings, said leaves of each disk of material being movable relative to each other and arranged such that substantially the entire open centers of said rings are occupied by said leaves, each leaf in each disk of material is angularly positioned between two adjacent neighboring leaves at its proximal end, and each leaf in each disk has a length from its proximal end to its distal end which differs from a length of at least one adjacent neighboring leaf in the same disk from its proximal end to its distal end, and said distal ends of at least some adjacent leaves in the same disk of material as one another have radially inward termination points that are spaced from one another while said disk of material is in said normal flat state.

2. A two-way damper according to claim 1, wherein said plurality of leaves are formed in a single disk of material.

3. A two-way damper according to claim 2, wherein said single disk of material is secured and held stationary at an outer periphery thereof.

4. A two-way damper according to claim 3, wherein said single disk is secured and held stationary along the entire outer periphery thereof.

5. A two-way damper according to claim 1, wherein said plurality of leaves are formed in two overlying disks.

6. A two-way damper according to claim 5, wherein said two disks of material are secured and held stationary at an outer periphery thereof.

7. A two-way damper according to claim 6, wherein said two disks are secured and held stationary along the entire outer periphery thereof.

8. A two-way damper according to claim 1, wherein the at least one disk is made of a plastic material and said damper further including a first sheet of rubber material and a second sheet of rubber material, said at least one plastic disk being sandwiched between and in direct contact with said first and second sheets of rubber material, and said sheets of rubber material being slit along the same lines as said at least one disk.

9. A two-way damper comprising two retaining members and a baffle sandwiched between said two retaining members, said baffle comprising a flexible member with a first portion secured and held in a fixed position between said retaining members and a second portion normally oriented in a first closed position, but free to move relative to said first closed position, a third portion, arranged between said first and second portions being flexible and resilient and allowing said second portion to move to a second position relative to said first closed position upon the application of a pressure differential across said baffle above a threshold pressure and causing said second portion to return to said first closed position upon the application of a pressure differential across said baffle below said threshold pressure, each of the retaining members having a first face, a second face and an open center with a centerpoint extending between the first face and the second face;

the open center of each retaining member being defined by an edge, each edge being curved in a circumferential direction such that each edge is generally circular in shape in a circumferential direction, and each edge being curved in an axial to radial direction from the first face to the second face such that a diameter of the open center is smaller at the first face than a diameter of the open center at the second face;

the two retaining members being arranged with their second faces facing each other;

said baffle flexible member comprising a plurality of flexible and resilient leaves formed in at least one disk of material secured between said retaining members which extend in a surrounding relationship relative to said baffle, in each disk of material, each leaf having a fixed proximal end comprising the first portion of the baffle secured between the second faces of said retaining members and a free distal end comprising the second portion of the baffle located toward the open centers of said retaining members, said leaves of each disk of material being movable relative to each other and arranged such that substantially the entire open centers of said retaining members are occupied by said leaves, each leaf in each disk of material being angularly positioned between two adjacent neighboring leaves at its proximal end, and each leaf in each disk having a length from its proximal end to its distal end which differs from a length of at least one adjacent neighboring leaf in the same disk from its proximal end to its distal end, and said distal ends of at least some adjacent leaves in the same disk of material as one another having radially inward termination points that are spaced from one another while said second portion is oriented in said first closed position.

10. A two-way damper according to claim 9, wherein said flexible member is secured and held stationary at an outer periphery thereof.

11. A two-way damper according to claim 10, wherein said flexible member is secured and held stationary along the entire outer periphery thereof.

12. A two-way damper according to claim 9, wherein said plurality of leaves are formed in a single disk of material which is slit along lines to form said leaves.

13. A two-way damper according to claim 9, wherein said plurality of leaves are formed in two overlying disks.

14. A two-way damper according to claim 9, wherein said at least one disk is formed of a plastic material and said damper further including a first sheet of rubber material and a second sheet of rubber material, said at least one plastic disk being sandwiched between and in direct contact with said first and second sheets of rubber material, and said sheets of rubber material being slit along the same lines as said at least one disk.

15. A two-way damper comprising:

a combination of a baffle and two retaining members, each of the retaining members having a first face, a second face and an open center with a centerpoint, the open centers of each retaining member being defined by an edge, each edge being curved in a circumferential direction such that each edge is generally circular in shape in a circumferential direction, and each edge being curved in an axial to radial direction from the first face to the second face such that a diameter of the open center is smaller at the first face than a diameter of the open center at the second face, said baffle comprising a generally circular flexible member with a first portion, at a portion of a periphery of said member, secured and held in a fixed position between said retaining members at the second faces of the retaining members, a second portion spaced from said retaining members normally oriented in a first closed position, but free to move relative to said first closed position, and a third portion, arranged between said first and second portions, being flexible and resilient and allowing said second portion to move to a second position relative to said first closed position upon the application of a pressure differential across said baffle above a threshold pressure and causing said second portion to return to said first closed position upon the application of a pressure differential across said baffle below said threshold pressure, said baffle comprising a plurality of flexible and resilient leaves formed in at least one disk of material and secured between said retaining members which extend in a surrounding relationship relative to said baffle, each leaf having a fixed proximal end comprising the first portion of the baffle secured between said retaining members and a free distal end comprising the second portion of the baffle located toward the open centers of said retaining members, each leaf in each disk of material being angularly positioned between two adjacent neighboring leaves at its proximal end, and each leaf in each disk having a length from its proximal end to its distal end which differs from a length of at least one adjacent neighboring leaf in the same disk from its proximal end to its distal end, said leaves being movable relative to each other and arranged such that substantially the entire open centers of said retaining members are occupied by said leaves, the distal ends of at least some adjacent leaves in a common disk of material having radially inward termination points that are spaced from one another while said second portions are in said first closed position, said at least one disk of material being made of a plastic material and said damper further including a first sheet of rubber material and a second sheet of rubber material, said at least one plastic disk being sandwiched between and in direct contact with said first and second sheets of rubber material, and said sheets of rubber material being slit along the same lines as said at least one disk of material.

16. A two-way damper according to claim 15, wherein said retaining member comprises a ring and said baffle is secured at its entire periphery to said ring.

17. A two-way damper according to claim 15, wherein said retaining member comprises a ring of rigid material and a mechanical fastening element extending between said ring and said baffle at two or more points around said periphery of said baffle.

18. A two-way damper according to claim 15, wherein said plurality of leaves are formed in a single disk of material which is slit along lines to form said leaves.

* * * * *